(12) United States Patent
Budd et al.

(10) Patent No.: US 9,409,507 B2
(45) Date of Patent: Aug. 9, 2016

(54) MODULAR MOVING SYSTEM AND APPARATUS

(71) Applicant: Magna Van Development Company LLC, Louise, KY (US)

(72) Inventors: David S. Budd, Tewksbury, NJ (US); Donald L. Gibson, Jr., Louisville, KY (US); George Gauntt, Georgetown, IN (US); Scott Stewart, Floyds Knobs, IN (US); Kevin Patrick, Somerset, NJ (US); Ron Shearer, Prospect, KY (US)

(73) Assignee: Magna Van Development Company LLC, Louise, KY (US)

( * ) Notice: Subject to any disclaimer, the term of this patent is extended or adjusted under 35 U.S.C. 154(b) by 17 days.

(21) Appl. No.: 14/322,337

(22) Filed: Jul. 2, 2014

(65) Prior Publication Data
US 2015/0016940 A1    Jan. 15, 2015

Related U.S. Application Data

(60) Provisional application No. 61/844,017, filed on Jul. 9, 2013.

(51) Int. Cl.
*B60D 1/155* (2006.01)
*B60P 1/64* (2006.01)
*G06Q 10/08* (2012.01)

(52) U.S. Cl.
CPC .............. *B60P 1/6418* (2013.01); *B60D 1/155* (2013.01); *G06Q 10/08* (2013.01)

(58) Field of Classification Search
CPC .... B62D 53/067; B62D 53/08; B62D 63/061; B62D 63/062; B62D 65/10; B60P 3/40; B60P 3/00; B60P 7/15; B60P 3/05; B60P 3/41; B60P 7/06; B60P 7/135; B60P 1/00; B60P 1/04; B60P 1/165; B60P 1/32; B60P 1/54; B60P 1/64; B60P 1/6418; B60P 7/0807
USPC .............. 280/400, 446.1; 414/800, 267, 678, 414/143.2, 23, 233, 281; 410/31, 32, 43, 410/44, 46, 121, 82, 2, 155, 100, 120, 150
See application file for complete search history.

(56) References Cited

U.S. PATENT DOCUMENTS

| | | | | |
|---|---|---|---|---|
| 2,036,535 A | * | 4/1936 | Nelson | 414/800 |
| 3,358,616 A | * | 12/1967 | Brodhead | 410/44 |
| 4,038,929 A | * | 8/1977 | Sain | 410/31 |
| 4,993,737 A | * | 2/1991 | Torcomian | 280/407 |
| 5,431,108 A | * | 7/1995 | Theurer et al. | 104/3 |
| 5,888,069 A | * | 3/1999 | Romanoff et al. | 434/33 |
| 6,183,176 B1 | * | 2/2001 | Weiner | 410/32 |
| 7,533,896 B2 | * | 5/2009 | Zhang et al. | 280/491.1 |
| 8,534,968 B2 | * | 9/2013 | Van Uum et al. | 410/32 |

* cited by examiner

*Primary Examiner* — Glenn Dayoan
*Assistant Examiner* — Sunsurraye Westbrook
(74) *Attorney, Agent, or Firm* — Wood, Herron & Evans, LLP

(57) ABSTRACT

A method of moving freight which utilizes removable storage units or containers that have the same or similar size and which can be positioned on a specially designed truck frame and/or a trailer frame. The storage units are filled with freight such as household goods, taken to a storage facility or warehouse and stored by removing the entire storage unit from the truck or trailer utilizing, for example, a fork lift. The freight can be reloaded by loading the storage unit onto a truck or a trailer, which then delivers the freight to its final destination where it is removed from the storage unit. Multiple storage units loaded at different locations can be transported by the same truck and trailer from the warehouse to separate final unloading destinations. The truck and trailer are connected by a stinger steer mechanism which adjusts the distance between the truck and trailer providing a more versatile unit.

12 Claims, 9 Drawing Sheets

MODULAR MOVING SYSTEM AND APPARATUS

RELATED APPLICATION

The present application claims priority to U.S. Ser. No. 61/844,017, filed Jul. 9, 2013, the disclosure of which is hereby incorporated herein by reference in its entirety.

BACKGROUND OF THE INVENTION

Moving freight cross country presents various logistic concerns, in particular with moving household goods such as furniture, and the like. The majority of household goods when moved are removed from the moving van and stored. Subsequently, they must be reloaded to another moving van and taken to the final destination. There are various reasons that the freight, such as household goods, may need to be removed from the initial moving van and stored. There may not be a sufficient amount of household goods to fill a moving van. Therefore, additional freight or furniture may need to be accumulated so that the van moving the furniture, perhaps cross country, will be nearly full. Other times, the final destination of the household goods is not prepared to receive the household goods at the time they are removed from an initial location. The goods are off loaded, stored, reloaded and delivered at a later date.

Every time the household goods are moved, there is a possibility of damage, loss or theft. Also, off loading and reloading the household goods is very labor intensive, significantly increasing costs.

Most cross-country movers of household goods have two types of vehicles. The standard moving van or tractor-trailer for large moves, and a fixed-bed truck designed to move furniture within the tighter confines of a city for the initial pickup and the final delivery or for smaller moves. Again, this requires loading and unloading.

Although reusable shipping containers are common, they are not designed so that two containers can be loaded and unloaded at the same time in an efficient manner.

SUMMARY OF THE INVENTION

The present invention is premised on the realization that long distance moving of freight, particularly household goods such as furniture, can be facilitated by utilizing removable storage units or containers that fit on specially designed frames on a truck or trailer. The containers are delivered on a truck or trailer and loaded with, for example, furniture and household items. The containers can be taken to a storage facility such as a warehouse, removed from the frame in their entirety with the load of furniture still inside the unit and stored in the warehouse. The containers are specifically designed to be stacked and allow the household goods within the containers to be off loaded without significant labor. As the household goods are already in a sealed container, they do not have to be stored in a separate container once off loaded, and, finally, the container can be easily placed on top of the frames of a trailer or a truck when it is time to deliver the furniture to its final destination. But, the truck or trailer is not necessarily the same truck or trailer that delivered the container initially.

RFID (Radio Frequency Identification) and GPS (Global Positioning System) units, as well as other positioning systems such as GLS (Global Locating System) or GSM (Global Positioning for Mobile) can be incorporated into the container, allowing each container to be tracked in a storage facility or in transit.

Further, the present invention is premised on the realization that utilizing a tandem delivery system which incorporates a truck having a custom designed fixed frame adapted to receive a container and a trailer having a trailer bed which is adapted to receive a container provides added flexibility. The truck and trailer are of specific dimensions so that it makes no difference which container is placed on the truck and which container is placed on the trailer. In a most preferred embodiment, the truck is attached to the trailer utilizing a stinger steer that allows for the distance between the trailer and the truck to be adjusted, such as the stinger steer disclosed in Torcomian U.S. Pat. No. 4,993,737, the disclosure of which is hereby incorporated by reference.

Smaller containers, such as half-sized containers or third-sized containers, can also be used, allowing two or more smaller containers to be transported by one truck or trailer.

A truck connected with an adjustable stinger steer and with removable interchangeable containers provides many different options for a moving company.

The objects and advantages of the present invention will be further appreciated in light of the following detailed description and drawings in which:

DETAILED DESCRIPTION

Figure 1:
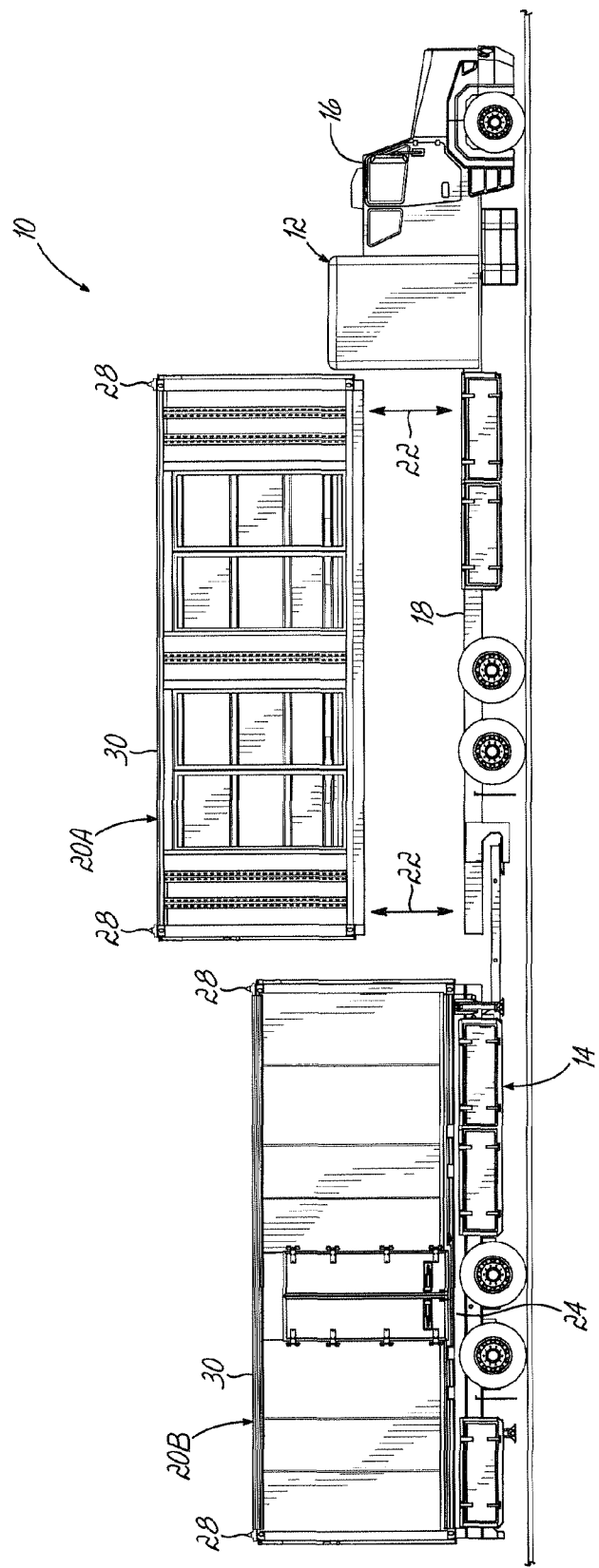
FIG. 1 is a perspective view partially exploded showing the present invention.

The present invention provides a method and apparatus to move freight, and is particularly suited for use in transporting household goods. The present invention utilizes a unique delivery apparatus, as shown in FIG. 1. This apparatus 10 includes a truck 12 and a trailer 14. The truck includes a power unit 16 and a fixed frame 18. Resting on the frame 18 is a storage unit or container 20A. As shown by arrows 22, this storage unit 20A can be raised or lowered from the frame 18 of truck 12. Likewise, trailer 14 includes a trailer frame 24 with a storage unit 20B resting on the trailer frame 24. Storage units 20A and 20B have the same exterior and interior dimensions. Storage unit 20A is shown with two side doors, whereas storage unit 20B is shown with a single side door. But they can also be built with no side doors or front doors to meet the customer's need. Both units will have front and rear doors (not shown), allowing access through all four walls of the unit. Either unit (20A, 20B) will fit on the trailer frame 24 or the truck frame 18. These storage units 20 are locked in place on the truck or trailer frame when being transported. The truck frame and trailer frame are specially designed to mate with the containers. There may be interfitting posts and holes in the respective container and frames to maintain the containers on the truck frame or trailer frame. As shown, removable upper connectors 28 are shown at corners of the units 20, located on roof 30. Connectors 28 allow the units 20 to be stacked.

Figure 5:
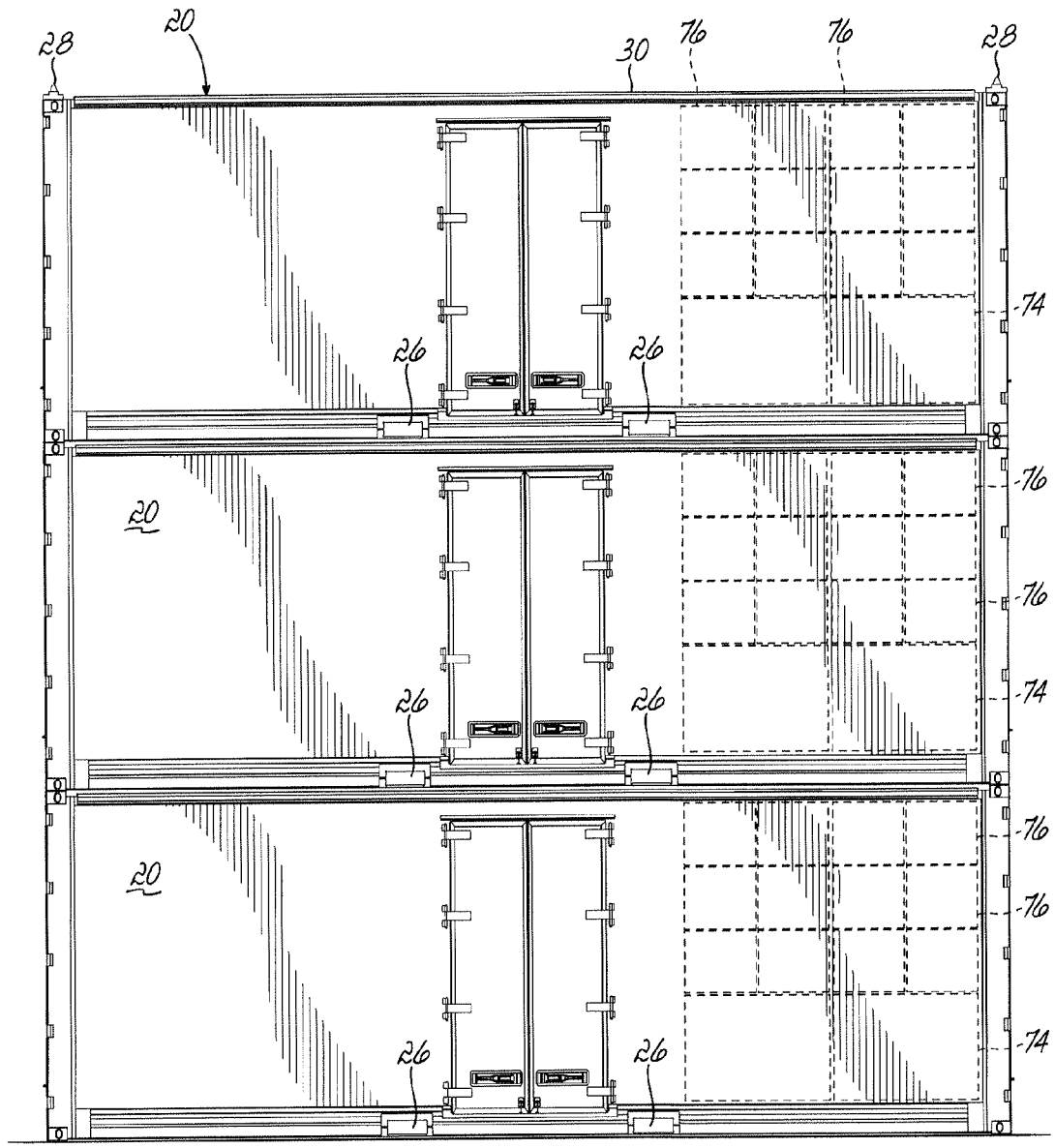
FIG. 5 is a side view of storage units in a stacked configuration.
Figure 6:
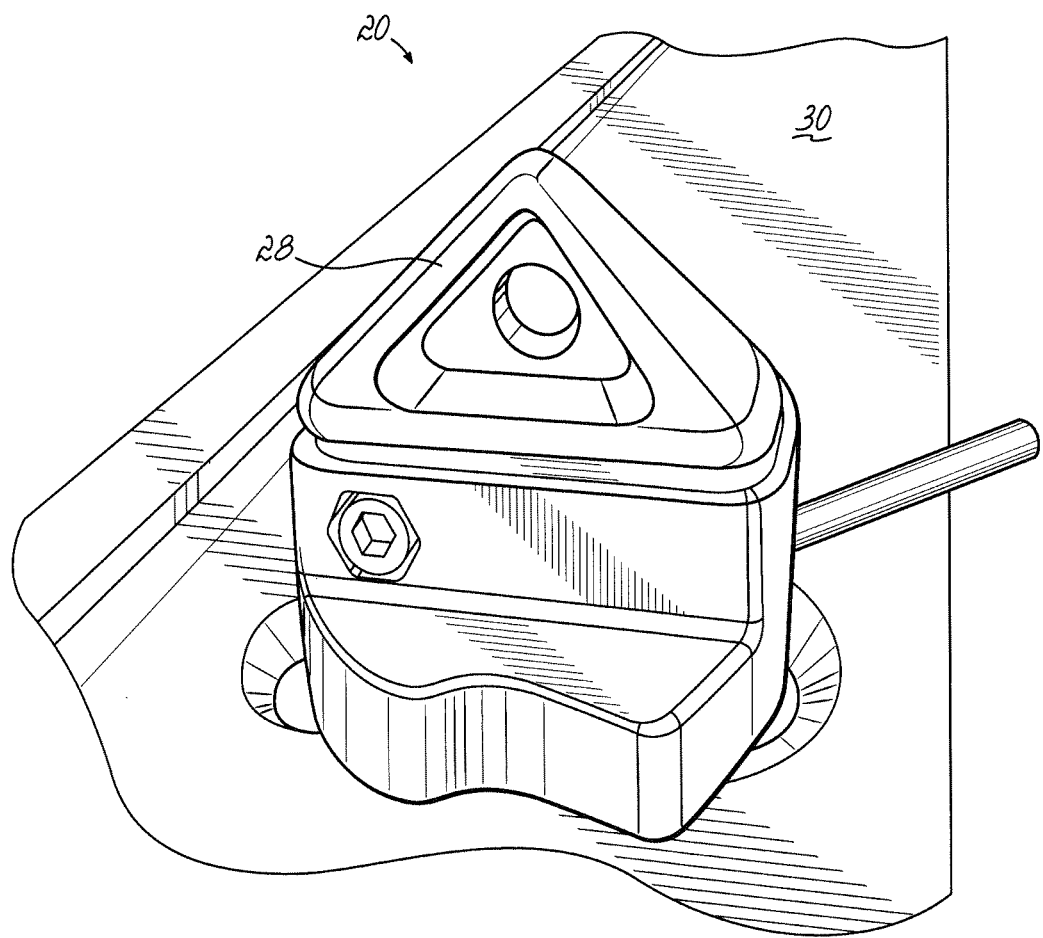
FIG. 6 is a enlarged view, broken away, of a portion of the roof showing the connectors.

The storage units 20 are designed to be removed from the truck or trailer frame and stacked in a storage facility as shown in FIG. 5. As such, the storage units include forklift openings 26. The corners of units 20 are also designed to be moved with a crane.

Figure 4:
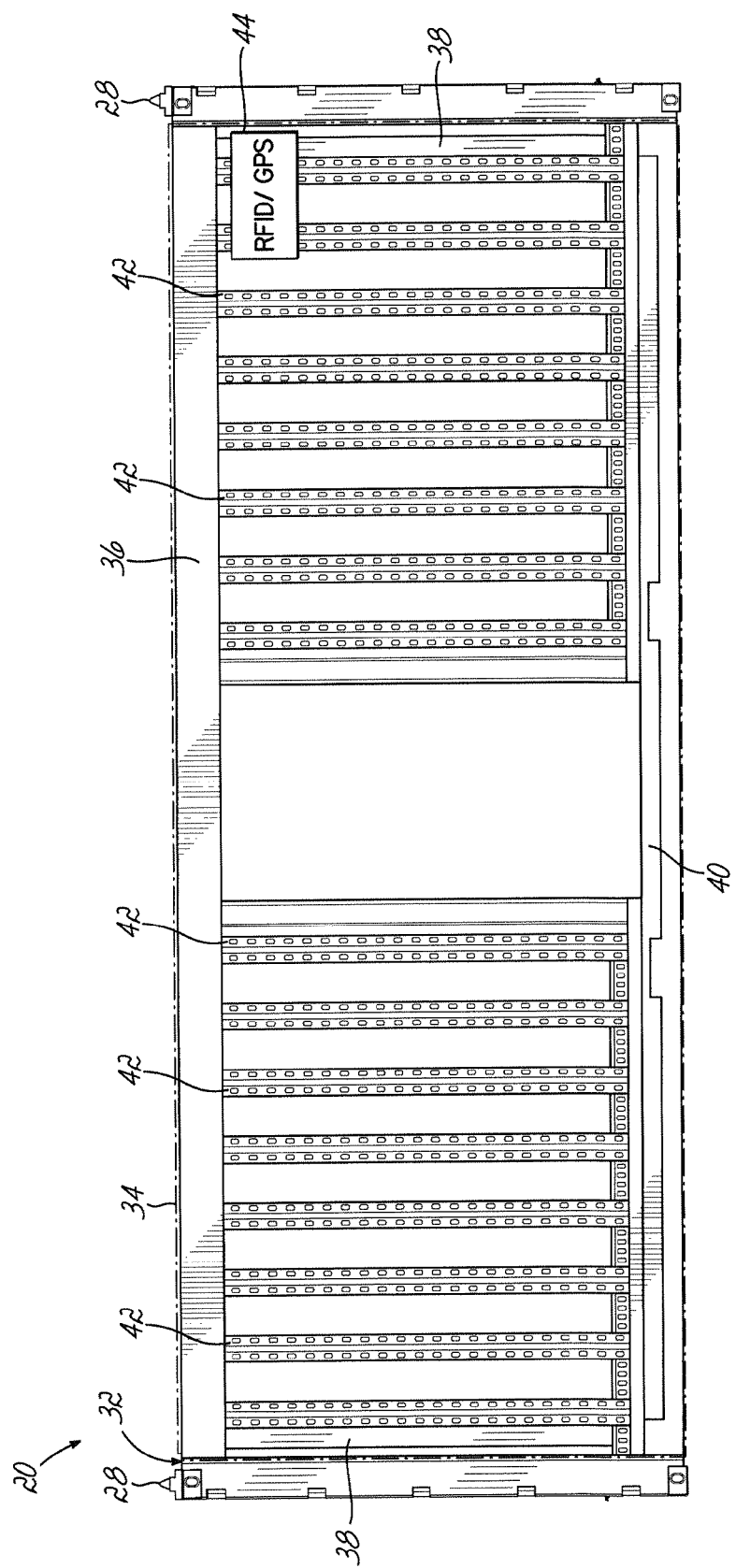
FIG. 4 is a side view of a storage unit with the outer skin removed.

FIG. 4 shows the unit frame 32 with the skin or surface 34 (shown in phantom) removed. The frame 32 includes a rectangular metal header 36 that extends around the periphery of the unit, along with metal corner posts 38 (only two shown), which are metal plates that extend from the header to the base 40 of the unit 20. In addition, a plurality of slotted channels 42 extends from the header 36 to the base 40, providing additional support. These slotted channels 42 are typically located in trailers to provide tie downs and support bars to prevent load shifting. But in this application they also provide strength, allowing the individual containers to be stacked one on top of the other. The exterior of the container is the skin material 34, which is typically a relatively thin sheet metal.

As explained hereinafter, the units 20 preferably include a locating system 44 located within the units 20. As shown, the locating system is located in an upper corner of the unit 20 but it can be located anywhere in or on the unit 20. The locating system can include one or more RFID, GPS, GLS and GSM units.

The trailer 14 can be attached to the truck 12 by any type of structure commonly used to connect a trailer with a truck. One preferred mechanism is the stinger steer disclosed in Torcomian U.S. Pat. No. 4,993,737, which allows the distance between the truck and the trailer to be adjusted to facilitate loading and unloading and/or highway transportation.

Figure 7:
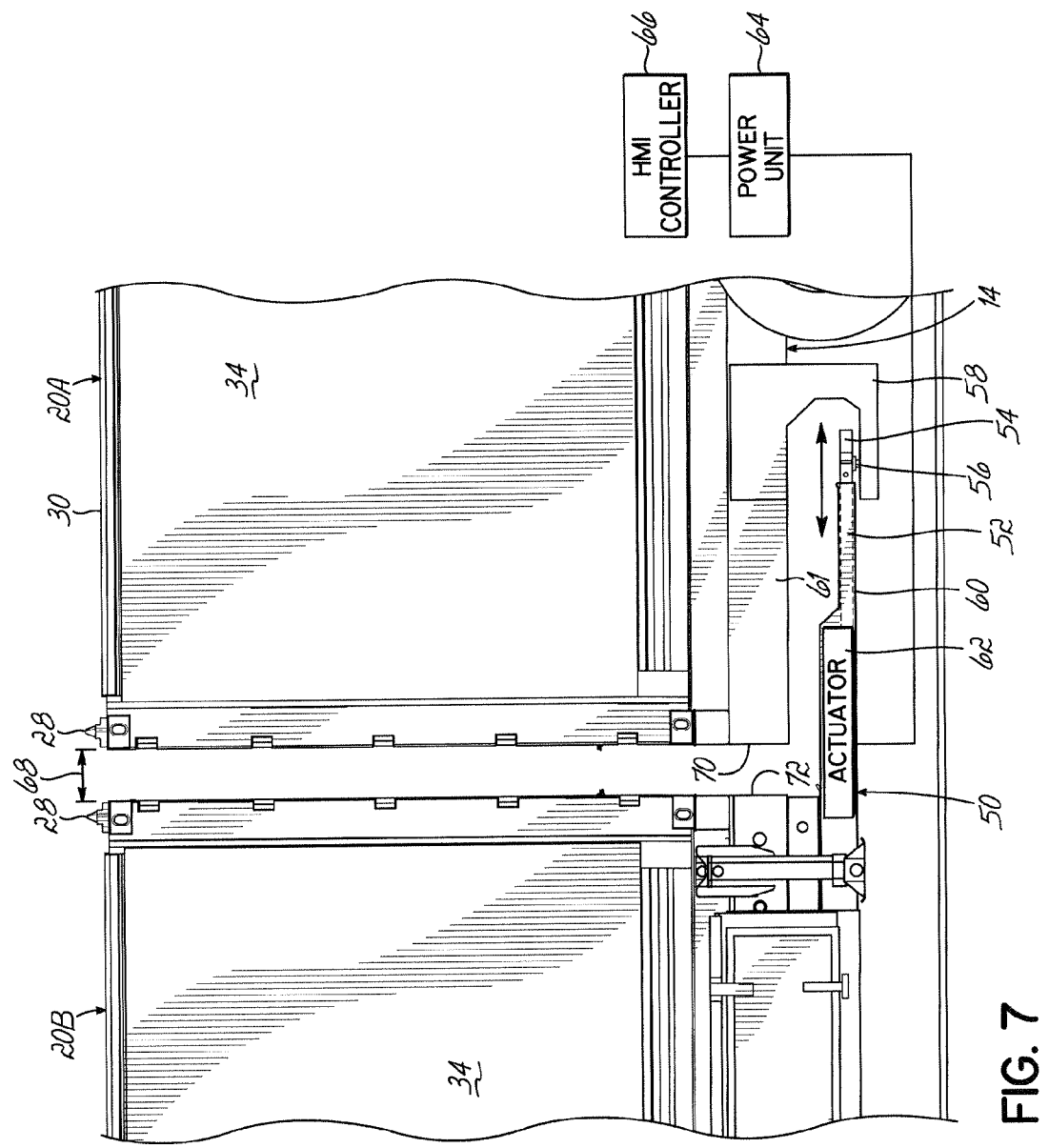
FIG. 7 is a side view showing a diagrammatic depiction of the control unit for the stinger steer mechanism used in the present invention.

In one embodiment, particularly shown in detail in FIG. 7, the truck 12 is attached to the trailer 14 using a stinger steer mechanism 50. The stinger steer mechanism 50 includes an extendable stinger 52 which incorporates a telescoping tongue 54 which rides in, on or over a housing 60. Tongue 54 includes a downwardly extended mounting post 56. The telescoping tongue 54 extends to a horizontal connecting platform 58 connected to the frame 61 of truck 12. Post 56 fits into a corresponding opening (not shown) in platform 58 connecting the truck with the trailer.

The stinger steer mechanism 50 includes an actuator 62 located in housing 60, which acts to move the telescoping tongue 54 relative to the housing 60. The actuator, which may be mechanical, electric, pneumatic or hydraulic, depending upon design, is attached to an appropriate power unit 64 which, in turn, is connected to a control unit 66 or human machine interface (HMI) located in the cab of the truck. The stinger position can be monitored to show the relative position of the trailer on the HMI. As explained hereinafter, the control unit 66 can move the telescoping tongue 54 in or out of the housing 60 which, in turn, alters the distance 68 between the rear of the truck frame 70 and the front of the trailer frame 72.

The actuator 62 can be used to bring the trailer 14 immediately adjacent the rear 70 of truck 12, so that the storage unit 20A can be accessed from storage unit 20B with the respective front and rear doors open. This simply makes it easier, in certain applications, to load the storage units 20A and 20B.

The stinger steer mechanism 50 also allows the distance 68 to be set, depending upon the particular use of the apparatus 10. The distance can be increased for city driving, allowing for sharper turns, and then, in turn, reduced for highway driving where sharp turns are not an issue. The distance can also be varied to allow for easier loading and unloading of storage units 20.

The stinger steer can be moved manually or automatically. As an example of the latter, an HMI can be connected to the speedometer of the truck so that it automatically draws the trailer to within, for example, two inches of the truck, when the apparatus 10 is operating at expressway speeds such as 55-60 miles per hour. This can be done automatically as the vehicle is moving and, in turn, the actuator 62 can separate the vehicles as the speed is reduced to speeds typically encountered in city driving, less than, for example, 55-60 miles per hour. This reduced spacing at highway speeds improves fuel efficiency.

Because the goods all stay within the units 20 until delivered to the final unloading destination, the units 20 can utilize the system specialized carrying containers 74 (shown in phantom in FIG. 5) designed to hold particular types of household goods, such as art work, mirrors, china and the like. Previously, these items would be specially packed and/or crated. Containers 74 are sized to avoid wasting space in units 20. The number and type of containers 74 will vary depending on the goods being moved and stored.

Figure 8:
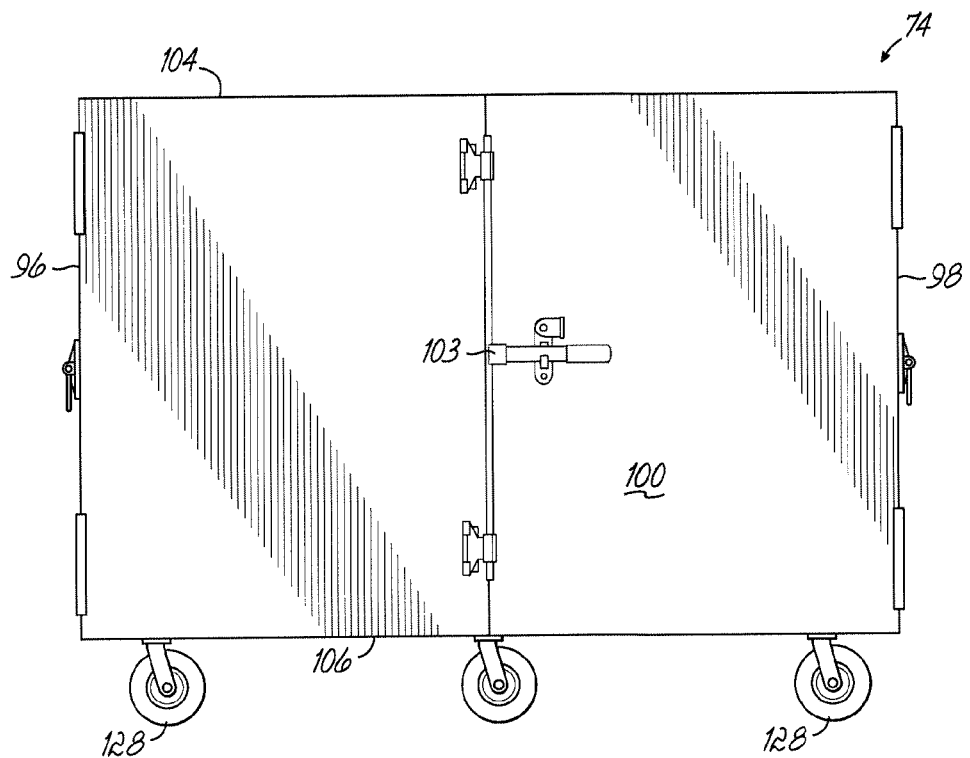
FIG. 8 is a perspective view of a crate for use in the present invention.
Figure 9:
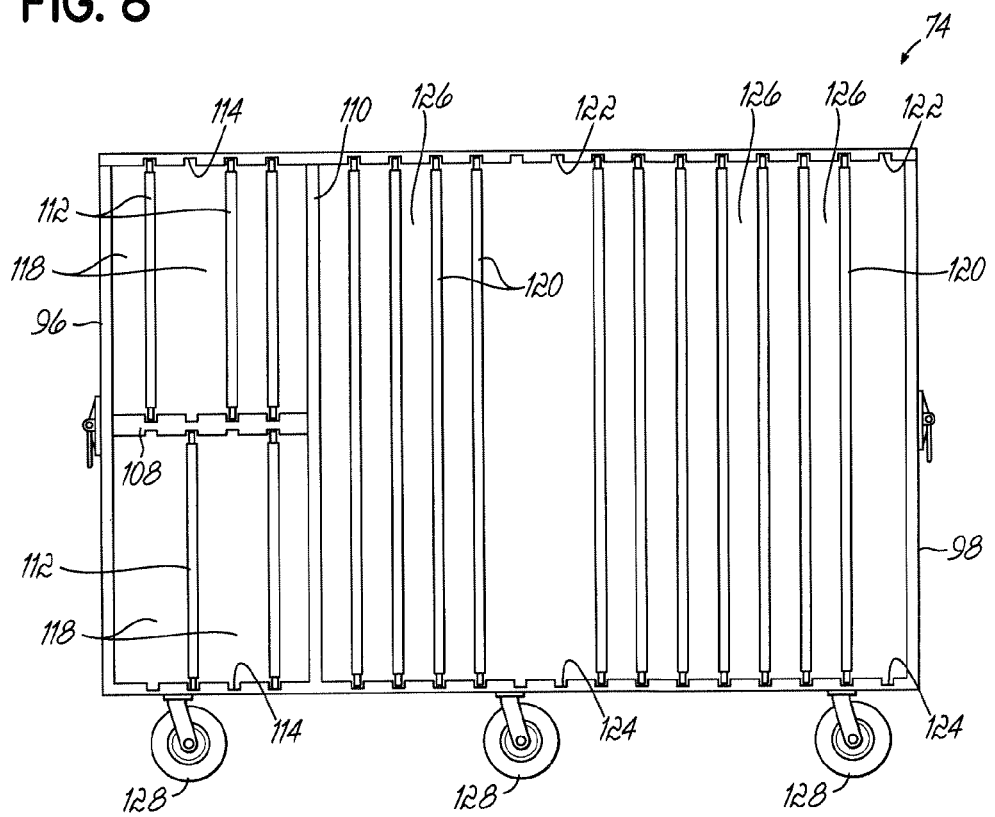
FIG. 9 is a cross-sectional view taken at lines 9-9 of FIG. 8.

FIGS. 8 and 9 show an exemplary specialty crate or container 74 for, in this case, storing articles such as pictures and mirrors. As shown, the container 74 includes opposed first and second walls 96, 98, as well as opposed first and second double swing doors 100 (only door 100 shown). Each door has a locking mechanism 103. The container 74 further includes a top wall 104 and a bottom wall 106. Inside the container 74 is a partial horizontal wall 108 supported by first wall 96 and an internal, permanent vertical wall 110. Extending between the horizontal wall 108 and either the top wall 104 or the base 106 are small dividers 112 that ride in channels 114. These are removable dividers. Thus, the area between adjacent dividers or walls provide small compartments 118 for holding smaller pieces of artwork, along with any packing or foam insulation.

Further, the containers 74 includes a series of large dividers 120 that ride in upper and lower channels 122 and 124 in the top and base of the carton 74. The distance between the large dividers provides large compartments 126. In addition to this, the containers 74 will generally include wheels 128, as well as handles which can be used to affix the containers to channels running along the sidewalls of the containers.

In use, containers 74 would be loaded at the initial loading location and placed in the storage unit 20, where they would stay until they reach their final desired unloading location and are unloaded. The containers 74 would then be returned to the shipping company.

Figure 10:
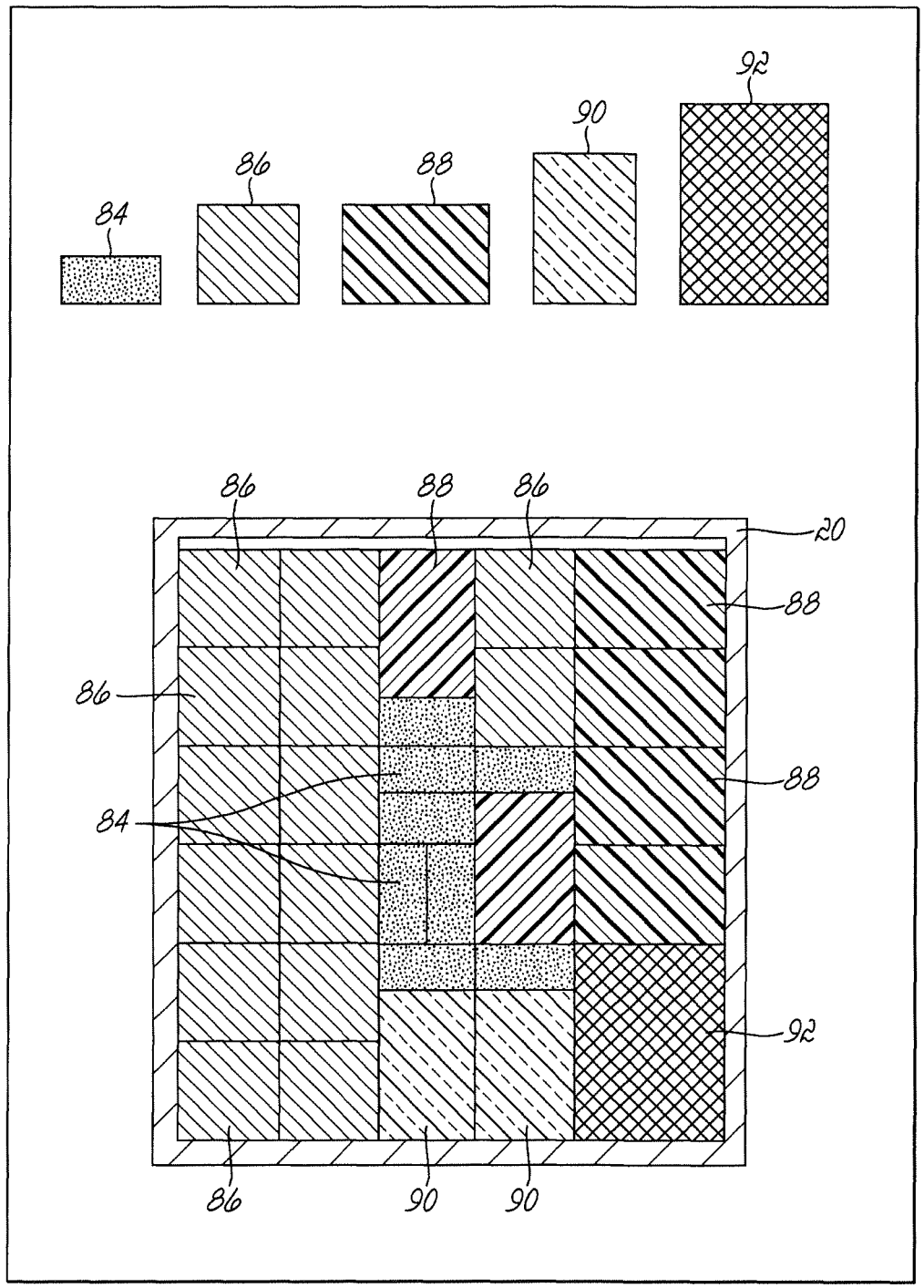
FIG. 10 is a diagrammatic depiction of a series of bins for use in the present invention.

Smaller reusable storage bins 76 (shown in phantom in FIG. 5) which are sized to stack and fit within the unit 20 with minimal wasted space can also be employed. Bins 76 can be any collapsible, reusable carton. Generally, these would be formed from molded plastics. As shown in FIG. 10, these are sized to maximize the use of the internal space of the unit 20. In particular, a plurality of different sized bins 84, 86, 88, 90 and 92 can be utilized. Each will have a first dimension or width and a second dimension of height and third dimension of depth. Generally, these will be multiples of a common length. For example, bin 84 may have a width of 18 inches, whereas bin 86 may have a width of 27 inches, both multiples of 9. There could also be a bin with a width of 36 inches.

Likewise, the height of the bin, when it is in a stacked position as shown in FIG. 10, will be of a common dimension. This again could be 9 inches, so that the smallest bin 84 has a height of 9 inches and a larger bin 86 may have a height of 36 inches. This allows small, medium, large and extra large bins to be stacked together, as shown in FIG. 10, to minimize unused or dead space. The multiple, such as 9 inches, will generally be dictated by the internal dimensions of the trailer. For example, a typical trailer may have an internal width of 99 inches. Therefore, 9 inches is particularly appropriate. It may have a height of 109 inches and, again, a common unit of height of 9 inches is appropriate.

Containers 74 and bins 76 all remain in the unit 20 from loading to unloading. After unloading, the containers 74 and bins 76 are returned to the empty unit 20 to be returned to the moving company. Reusing containers 74 and bins 76 avoids the waste from throwing away. Alternately, bins 76 could be purchased by the customer for personal use.

To practice the present invention, the apparatus 10 shown in FIG. 1 is taken to an initial location and freight, such as furniture, is loaded into the storage unit 20A and/or 20B. If there was not enough freight to fill up more than one of the storage containers, the truck 12 could drive to the initial location without a trailer. Alternately, if there were two smaller moves, the trailer and storage unit 20B would be dropped at one location and the truck with the storage unit 20A would go to a separate location. Once finished, the truck and loaded storage unit 20A would return to the first location, pick up the trailer and storage unit 20B.

If both storage units 20A and 20B are needed to handle all of the freight at the initial location, the truck would arrive with the trailer and two storage units 20A and 20B.

If both units 20A and 20B are being loaded at the same time at the same loading location, the doors on the front wall of container 20B and the rear wall of container 20A can be opened and the stinger steer assembly 50 actuated to bring the trailer immediately adjacent the truck, so that the units 20A and 20B are immediately next to each other. This allows both units to be loaded and accessed from the door of 20B or any side door. The front, rear and side doors of the containers 20 can be any type typically employed with moving vans, including, for example, accordion doors which make it easier to bring the units 20A and 20B closer together and not interfere with each other. Once the unit 20A is filled, the actuator 62 can be used to separate the truck from the trailer, allowing the doors of the rear wall of the unit 20A to be closed and the unit 20B then can be subsequently loaded.

Once one or more storage units are loaded at the initial loading location, they are locked and the truck can take the one or more storage units 20 to a storage facility or warehouse. The entire storage unit 20 is removed using either a fork lift, crane, or other lifting device depending upon the facility, and placed in the storage facility, as shown in FIG. 5. These units 20 can be stacked on each other to reduce the amount of floor space required.

During transportation, the GPS unit 44 in the storage units 20 provides the location of unit 20 throughout the country and during subsequent transportation to its final location. In the storage facility, however, the RFID portion of the location indicator 44 identifies the unit 20 and its location within the storage facility. Thus, at all times, the precise location of each and every unit 20 throughout the nation is known, At the desired time, the one or more units 20 is taken from the storage facility, placed on a truck frame 18 and/or trailer frame 24, and transported to a final destination where the shipment would be, for the first time, off loaded from the storage unit 20. In particular, when transporting a unit 20 a long distance, two storage units 20A and 20B would be transported by one truck/trailer apparatus 10 even if the units 20A and 20B are intended for different unloading destinations. This allows smaller loads which would not fill an entire normal moving van to be easily consolidated and transported economically.

Because the freight or furniture is off loaded from the storage unit 20 only one time, the risk of damaging the furniture is minimized, labor is significantly reduced and none of the freight can be lost. Because the storage units 20A and 20B are interchangeable, they can be placed on the trailer or the truck bed, which provides significant versatility. This also facilitates delivering two separate loads in two separate storage units to two separate unloading destinations using single apparatus 10. This significantly improves logistics. Also, because the units are so easily interchanged, one storage unit could, for example, carry furniture, while the second carry more standard freight. This again facilitates the logistics of moving freight cross country.

Because the system of the present invention uses a trailer in combination with a fixed bed truck, the moving company does not require a separate tractor-trailer for cross-country moves and fixed-bed truck for local moves.

The articulation of the apparatus 10 is such that it is more maneuverable and has a tighter turning radius than a standard tractor and 53 foot moving van trailer. This would allow the truck/trailer apparatus 10 to get to locations where a typical tractor and 53 foot trailer cannot. For full truckloads, this eliminates the need to use a fixed bed truck as a shuttle to go back and forth between the delivery point and the 53 foot trailer in limited access areas. It also eliminates the time, labor and potential damage loading/unloading between the shuttle truck and the 53 foot trailer. If the area is so restricted that you cannot get the truck trailer apparatus 10 to the delivery point, the truck 12 can be separated from the trailer 14 and use the truck 12 as the shuttle truck.

Figure 2:
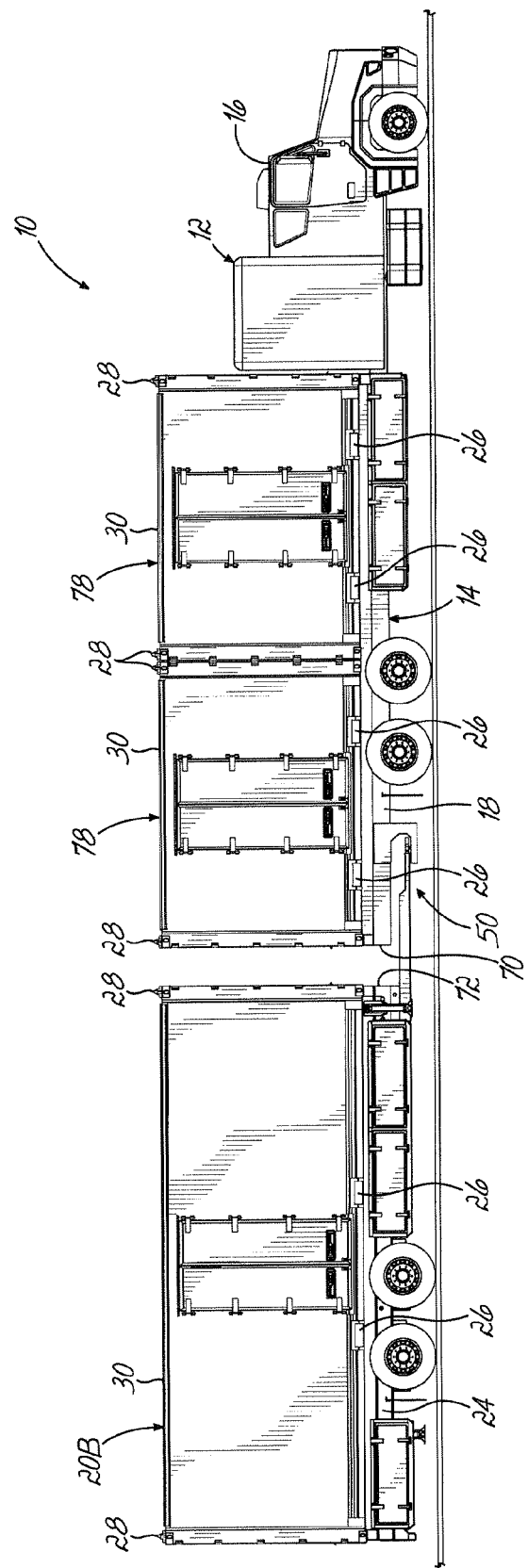
FIG. 2 is a view similar to FIG. 1 with two smaller storage units on the truck bed.
Figure 3:
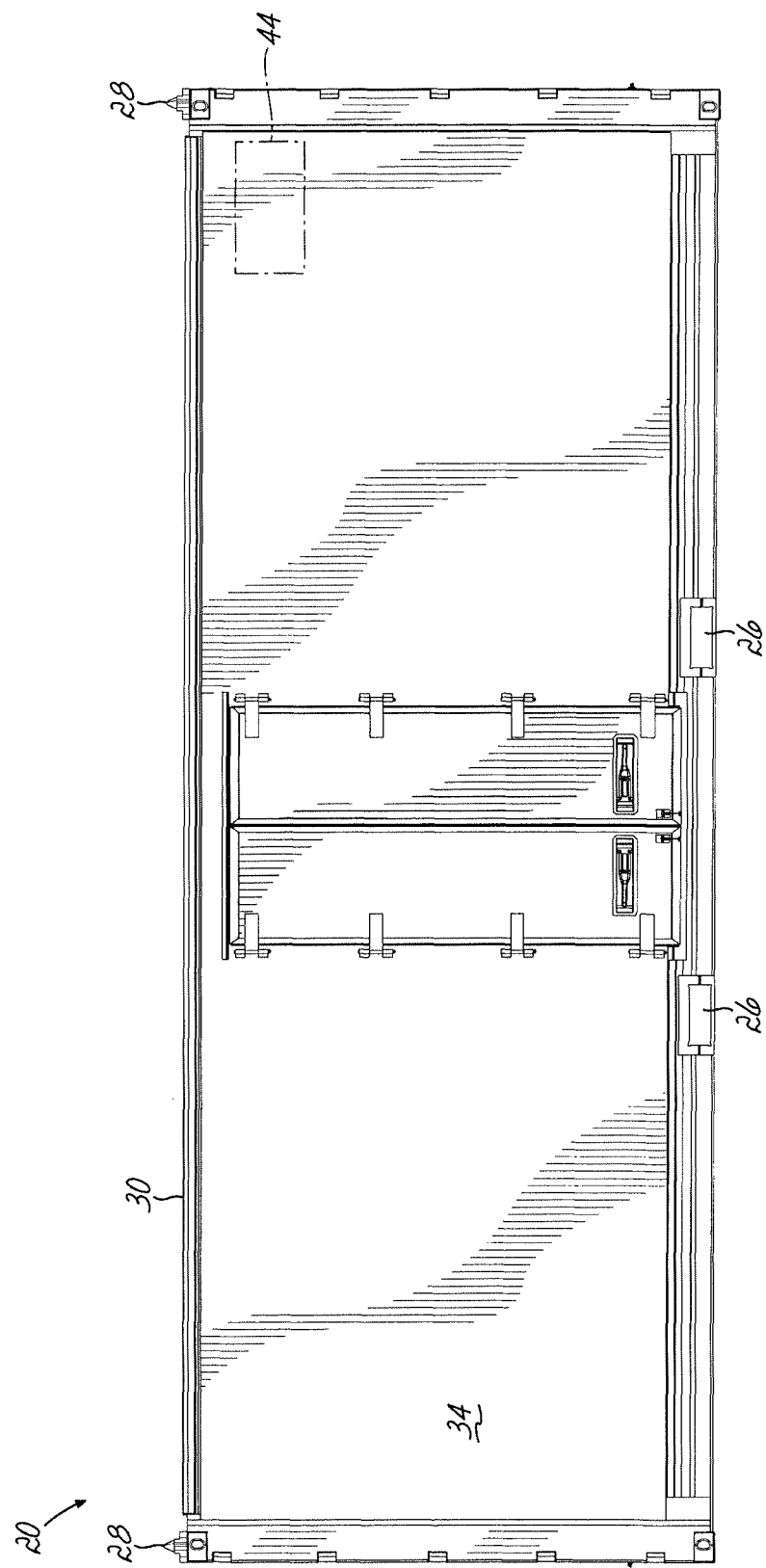
FIG. 3 is a side view of a storage unit.

Also, storage units 20A or 20B can be replaced by units 78 (see FIG. 2) which are one-half the length of a storage unit 20, but the same width. One truck frame or one trailer frame could carry multiple smaller units 78. For example, the units 20A and 20B, as shown in the drawings, may be, for example, 28 feet in length, whereas units 78 could be up to 14 feet in length. Again there will be features on the trailer frame and/or truck frame which will allow the smaller units 78 to mate with the trailer frame and frame bed. This provides added flexibility.

Thus the present invention which permits two large units or multiple small units or one large and multiple small units, maximizes efficiency particularly with respect to moving goods cross country. The reusable shipping containers 74 and bins 76 also reduces waste and improve efficiency.

This has been a description of the present invention along with the preferred method of practicing the present invention. However, the invention itself should only be defined by the appended claims, Wherein we claim:
1. A method of transporting freight comprising loading said freight on first and second storage units wherein said storage units have the same physical dimension and are each mountable on one of a first truck bed or a first trailer bed, each said storage unit having front and rear doors and a side door;
 loading said freight into said first and second storage units while said first and second storage units are mounted on said truck bed or said trailer bed;

removing said storage units from said truck bed or trailer bed and storing said storage units in a warehouse without removing said freight from said storage units, and stacking said first and second storage units with a plurality of additional storage units;

wherein said additional storage units are the same size as said first and second storage units;

removing said first storage unit and an additional storage unit from said warehouse and placing said first storage unit on a second truck and said additional storage unit on a second trailer connected to said second truck;

wherein said second truck and second trailer are connected by an adjustable stinger steer, allowing one to modify a distance between said second truck and said second trailer; and delivering said freight to at least one desired unloading location without removing said freight from said first and second storage units until said freight is at said at least one desired unloading location.

2. The method claimed in claim 1 wherein said first storage unit is delivered to a first desired unloading location and said second storage unit is delivered to a second desired unloading location.

3. The method claimed in claim 1 wherein said first storage unit is loaded with freight at a first loading location and said second storage unit is loaded with freight at a second loading location and wherein said first and second storage units are stored at the same warehouse.

4. The method claimed in claim 3 wherein the location of said storage units are tracked using at least one of GPS, GLS and GSM, and further wherein the location of the first and second storage units are tracked in said storage facility using RFID.

5. The method claimed in claim 1 wherein said first and second storage units are locked immediately after being loaded with freight and remain locked until delivered to said at least one desired unloading location.

6. The method claimed in claim 1 wherein said storage units include one or more reusable storage container holding portions of said freight, said reusable storage container remaining in the storage units until off loaded with said freight at said desired unloading location.

7. The method claimed in claim 6 wherein at least one of said storage containers is filled with china.

8. The method claimed in claim 6 wherein at least one of said storage containers is filled with artwork.

9. A delivery system comprising a truck having a truck frame and a trailer having a trailer frame;

first and second removable large storage units each having the same exterior dimensions and each mountable on either of said truck frame and said trailer frame and wherein said storage units are stackable on each other, wherein said truck is attached to said trailer by an adjustable stinger steer mechanism wherein a length of said stinger steer is automatically changed in response to a speed of said truck as said truck is moving and wherein said stinger steer is also manually adjustable.

10. The delivery system claimed in claim 9 further comprising a plurality of small storage units;

wherein two or more small storage units are mountable to one of said truck and/or trailer.

11. A truck attached to a trailer by a stinger steer wherein a length of said stinger steer is adjusted by an actuator and said actuator adjusts said length in response to a speed of said truck and wherein said stinger steer is also manually adjustable.

12. A method of transporting freight comprising loading said freight on first and second storage units wherein said storage units have the same physical dimension and are each mountable on one of a truck bed or a trailer bed, each said storage unit having front and rear doors;

loading said freight into said first and second storage units while said first and second storage units are mounted on a truck bed or a trailer bed and delivering said first and second storage units to a warehouse;

removing said first and second storage units from said truck bed or trailer bed and storing said storage units along with a plurality of additional storage units wherein at least some of said storage units are stacked on each other in a warehouse without removing said freight from said storage units, removing said first storage unit and one of said additional storage units from said warehouse and placing said storage units on a truck and on a trailer connected to said truck;

wherein said truck and trailer are connected by an adjustable stinger steer, allowing one to modify a distance between said truck and said trailer; and delivering said freight to at least one desired unloading location without removing said freight from said storage units until said freight is at said at least one desired unloading location.

* * * * *